G. W., G. H. & F. B. DUNBAR.

J. F. EMERSON, administrator of G. W. DUNBAR, dec'd, said EMERSON assignor to G. H. & F. B. DUNBAR.

METHOD OF PRESERVING SHRIMPS IN METAL CANS.

No. 10,848. Reissued July 12, 1887.

Fig. 3

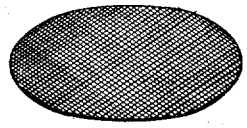

Fig. 1

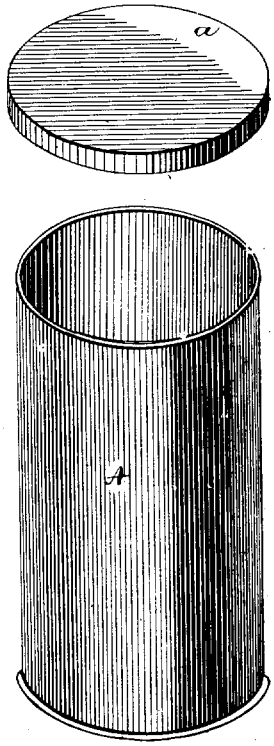

Fig. 2.

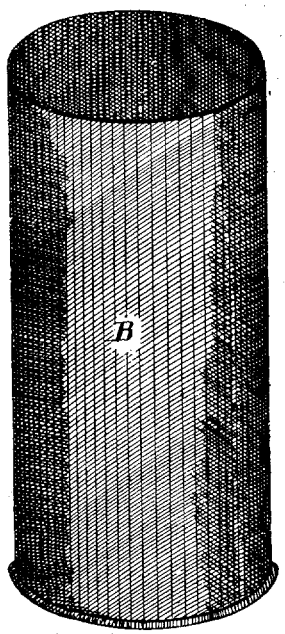

James F. Emerson,
Administrator of the estate of
George W. Dunbar, deceased.
George H. Dunbar
Francis B. Dunbar
surviving
Inventors:
by Wright Brown & Crosby
Attorneys.

Witnesses:
William C. Ramsay;
William C. Baird,

UNITED STATES PATENT OFFICE.

JAMES F. EMERSON, (ADMINISTRATOR OF GEORGE W. DUNBAR, DECEASED,) OF WAKEFIELD, MASSACHUSETTS, AND GEORGE H. DUNBAR AND FRANCIS B. DUNBAR, OF NEW ORLEANS, LOUISIANA; SAID ADMINISTRATOR ASSIGNOR TO SAID GEORGE H. DUNBAR AND FRANCIS B. DUNBAR.

METHOD OF PRESERVING SHRIMPS IN METAL CANS.

SPECIFICATION forming part of Reissued Letters Patent No. 10,848, dated July 12, 1887.

Original No. 178,916, dated June 20, 1876; Reissue No. 9,957, dated December 6, 1881. Application for reissue filed April 13, 1887. Serial No. 231,709.

*To all whom it may concern:*

Be it known that GEORGE W. DUNBAR, GEORGE H. DUNBAR, and FRANCIS B. DUNBAR, residents of the city of New Orleans and State of Louisiana, did during the lifetime of said GEORGE W. DUNBAR invent a certain new and useful Improvement in Methods of Preserving Shrimps in Metal Cans; and we do hereby declare the following to be a full, clear, and correct description of the same, reference being had to the annexed drawings, making a part of this specification.

The object of our present invention is to provide an improved method of preserving shrimps or prawns, and, indeed, all kinds of shell-fish, preventing their discoloration and insuring the retention of their original freshness and flavor.

Primarily, our improvement consists in so placing a suitable textile fabric between the fish or other article of food to be preserved as to cause it to so intervene as to prevent under all circumstances any direct contact between the metallic surface of the can and its contents; and it is the employment of such textile fabric, in connection with the process hereinafter described of treating the fish or other article, both before and after the same is placed in the can and sealed, which constitutes the nature or subject-matter of our present invention.

In the accompanying drawings is illustrated, at Figure 1, a metallic can, such as is ordinarily used for articles of food which are offered to the trade in a canned state. Fig. 2 is a textile lining, which we propose usually to make (although there is nothing arbitrary about the form, as other forms may be used) in the form of a cylindrical bag or sack, the diameter of which when filled is to be such as will permit of its fitting snugly within the can.

A is the metallic can; *a*, its lid or cover. B is the bag or sack constructed of cotton, muslin, or any other suitable textile fabric. Material of the cheapest and most inferior quality may be used, as the sole object of its use is to prevent the article to be preserved from coming in direct contact with the surface of the can, and which contact with the metal in the case of the shrimp causes during the process of boiling and all along thereafter until the can is opened a profuse precipitation of a black substance, generally believed to be sulphur, and which supposition is based upon the fact that the shrimp is said to possess a much larger proportion of sulphur than other shell-fish. The substance thus precipitated not only discolors the fish, (shrimp,) but detracts much from the color, freshness, and richness of its flavor. Now, practical experience has fully demonstrated the fact that by using a textile fabric, as described, the precipitation of the substance alluded to is prevented, or at least does not appear either on the fabric or metal, and hence the value and importance of this feature of our invention.

*b*, Fig. 3, is a circular piece cut out of material similar to that of which the bag B is made, and which is inserted within the mouth of the latter after the same is filled with the fish or other article to be preserved.

Such a can and lining as herein described are admirably adapted for the purpose attained by our present invention; but, as before stated, there is nothing arbitrary about the peculiar form and construction of the textile-fabric lining, as other forms and arrangements might be substituted therefor without in any manner altering the principle of the invention.

Having now fully described, as it were, the mechanical features of the invention, we will briefly state the process employed in connection therewith, especially when shrimps are the articles to be preserved.

The shell having been removed from the shrimp in the usual manner, the fish is thrown into salt-water of about 6° and there remains for an hour, (more or less,) and from thence to kettles filled with water and brought to a boiling heat, after which they are placed on drippers and cooled and thoroughly rinsed with fresh cold water, and from which, so soon as thoroughly dripped, in a moist condition, they are placed in the sack B, the same having been previously arranged in the can A, and without the addition of any salted or otherwise prepared liquid. So soon as the sack is filled, the mouth thereof being properly secured, the lid or head *a* is placed in position on the can A and immediately sealed. The cans are then subjected to a steam-bath, or placed in kettles containing boiling water and boiled for two hours at the highest temperature attainable, and which completes the process.

What we claim as new, and desire to secure by Letters Patent, is—

The herein-described method of preserving shrimps, &c., preventing their discoloration, which consists in placing textile fabric between the can and its contents and then sealing the can and subjecting the same to a boiling process, substantially as and for the purpose specified.

JAMES F. EMERSON,
*Administrator.*
GEO. H. DUNBAR.
FRANCIS B. DUNBAR.

Witnesses:
J. SCHONERAS,
H. P. LABUTUT.